United States Patent Office 3,085,426
Patented Apr. 16, 1963

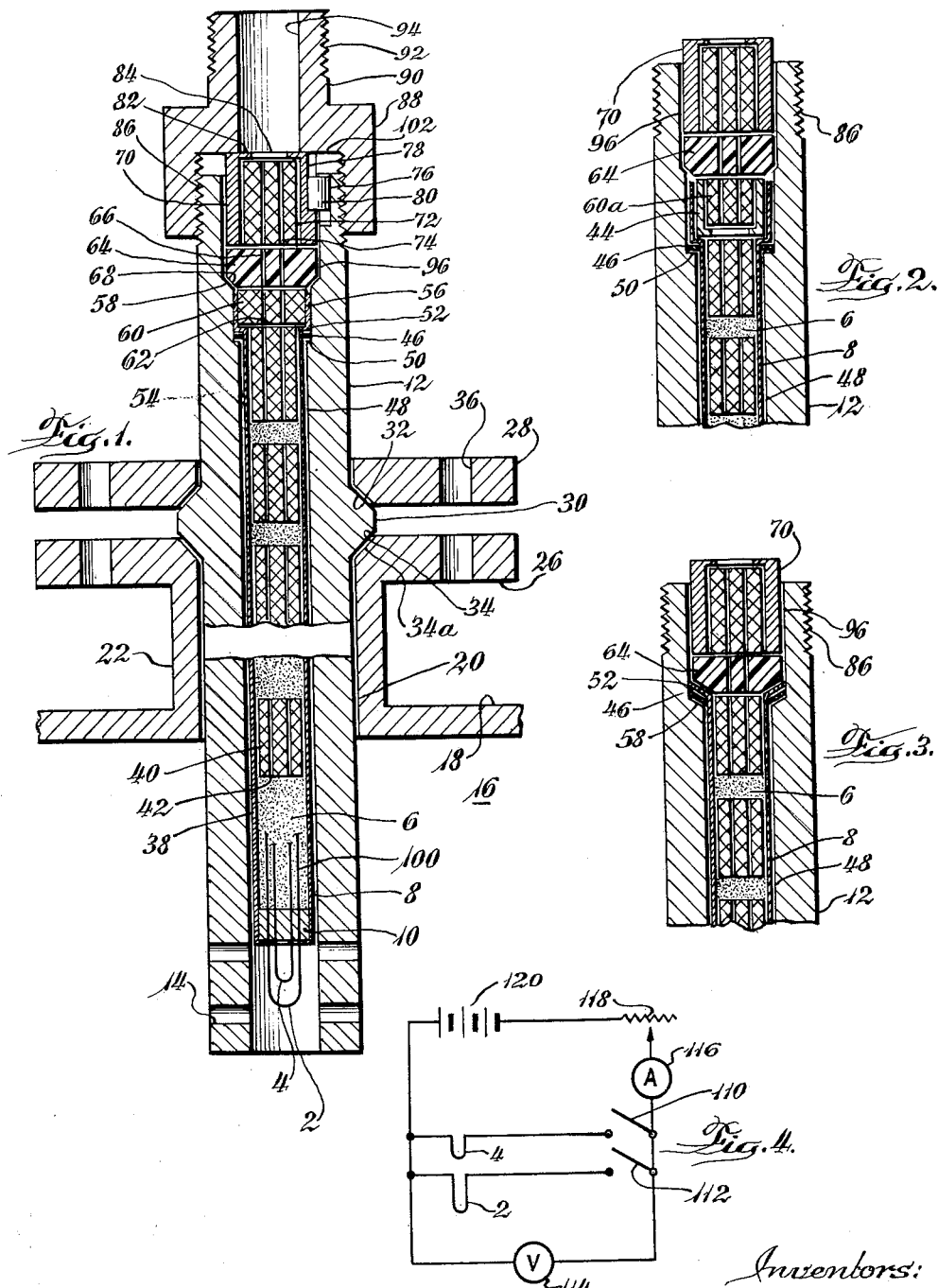

3,085,426
CONDUCTOMETRIC CORROSION TEST PROBE WITH REPLACEABLE PROBE INSERT
Arthur J. Freedman, Chicago Heights, Ill., and George Reid, Munster, Ind., assignors to Standard Oil Company, Chicago, Ill., a corporation of Indiana
Filed July 7, 1959, Ser. No. 825,584
4 Claims. (Cl. 73—86)

This invention relates to apparatus for measuring rates of corrosion and erosion. More particularly, it relates to an improved test probe construction for electrical measurement of such rates at extremely high temperatures and pressures.

An electrical resistance system has heretofore been developed which directly measures loss of metal from a corrosion test specimen exposed to a corrosive substance within process equipment, pipelines, and the like. As the test specimen becomes thinner due to corrosion, its electrical conductivity decreases. By electrically measuring the increase in resistance of the test specimen, the loss of metal from the specimen can be determined and, correspondingly, the rate of corrosion of the equipment itself can be measured quickly and accurately. Likewise this system may be used for evaluating the effectiveness of chemical corrosion inhibitors.

For measuring the change in resistance, a number of electrical circuits have hitherto been developed. These operate in either an intermittent or continuous manner, and are based on simple electrical relationships between current flowing through the test specimen and the potential drop across the specimen. Improved circuits of this type, usually using Wheatstone or Kelvin bridges, permit internal correction for temperature fluctuations. All of the foregoing circuits require a second but corrosion-insensitive specimen, termed the "reference specimen," to be placed in circuit with the test specimen as a means of providing temperature-compensation.

When test specimens are to be inserted via suitable probes into process equipment, it is evident that the probes must be of such durability that they may withstand all mechanical and thermal shocks to which the equipment itself may be exposed. In addition, the test probe should be capable of withstanding the elevated pressures and temperatures commonly found in chemical processing equipment, pipelines, and the like. Also, inasmuch as the corrosion test specimen eventually corrodes away, the specimen at least should be replaceable. Moreover, the test probes should be low in cost.

It is, accordingly, a primary object of the present invention to provide a sturdy corrosion test probe assembly having an expendable and replaceable specimen-carrying probe insert. Another object is to provide a test probe adapted for high pressure and high temperature service. A further object is to provide a probe which can be manufactured simply and without need for close mechanical tolerances. Yet another object is to provide a test probe assembly which affords superior corrosion and mechanical protection for the electrical circuit lead wires. Other and more particular objects will become apparent as the description of this invention proceeds in detail.

Briefly, a test probe assembly in accordance with the invention is provided which comprises a body member adapted for sealing attachment to equipment such as pressure vessels which confine a corrosive atmosphere. The body member is provided with a bore having one or more shouldered portions upon which is mounted an annular deformable gasket. A replaceable test probe insert, which carries the test specimen at one end thereof and which houses the lead wires, is inserted into the bore, and a deformable electrically-nonconducting plug is then placed in the bore in back of the replaceable probe insert. This deformable plug has a tapering portion and apertures passing therethrough which receive the electrical lead wires from the corrosion specimen and from any reference specimen. By applying compressive force to the deformable plug via a suitable follower, the plug is forced into sealing relationship with the lead wires and with the body portion, and also transmits pressure to compress and seal the gasket between the replaceable insert and the corresponding shoulder of the body member.

The probe thus described possesses numerous advantages over heretofore available probes. Primarily, the insert is replaceable and expendable. Also, the insert may be sealed at the outer end so as to afford a form of double sealed protection of lead wires and terminals against leaks and internal corrosion. The use of a deformable gasket and a deformable plug assure rigid mechanical mounting but, at the same time, obviate the need for accurate machining. Furthermore, corrosion test probes in accordance with the invention are extremely rugged and afford rigidity and protection for the corrosion test specimen in shipment and in use.

The invention will be described in more detail in the ensuing detailed description thereof when read in conjunction with the attached drawings wherein:

FIGURE 1 is a cross-sectional view of a preferred embodiment of the invention as installed in a chemical processing vessel;

FIGURE 2 is a cross-sectional view of an alternate embodiment of the invention;

FIGURE 3 is a sectional view of another embodiment which is considerably simpler and may be employed in less severe services; and FIGURE 4 is an illustrative schematic electrical circuit for measuring the change in resistance of the test specimen.

Referring to FIGURE 1, the test probe assembly comprises an expendable corrosion test specimen 2 which is sealed into one end of a replaceable probe insert 6, which in turn is received in a body member 12 that is connected to vessel 18 by way of port 20.

The corrosion test specimen 2 is an elongated wire, tube, or strip of metal corresponding in corrosion susceptibility to the metal of vessel 18. Thus, any corrosion experienced by vessel 18 is correspondingly exhibited as a reduction in cross-section area of corrosion specimen 2. The size, shape, thickness, and construction of specimen 2 is dependent largely on the expected degree of corrosion and on the mechanical shocks which it is expected to undergo. Desirably, corrosion test specimen 2 has a length and width as large as is convenient for protection of the specimen within the vessel 18. Its cross section and surface area are selected to provide the optimum precision in measuring corrosion rates. For example, if corrosion is relatively slow, specimen 2 may be quite thin so that a small reduction in thickness is actually a large percentage reduction. On the other hand, as corrosion rates are repeated or if it is desired to maintain a corrosion probe installation without replacing for a long period of time, the thickness of specimen 2 may be increased.

For example, suitable dimensions of test specimen 2 may be a flat strip about 2" long by about ¼" wide and about thirty-thousandths of an inch thickness.

The reference specimen 4, which provides a means for compensating for temperature changes and the temperature coefficient of resistance of reference specimen 2, is preferably made of a material which has a substantially identical temperature coefficient of resistance to that of the test specimen 2. When possible, reference specimen 4 should be made of the same material as reference specimen 2, and should have experienced the same physical and thermal treatment in fabrication. Since reference specimen 4 is required for the purpose of making temperature corrections independent of resistance changes due to corrosion, reference specimen 4 is made insensitive to corrosion either by making it sufficiently thick so that the redutcion in its cross-sectional area would be negligible, or by protecting the reference specimen with suitable resinuous coatings, by encasement in corrosion-resistant materials, or by depositing on its surface a thin layer of corrosion-resistant metal such as one of the noble metals.

As indicated previously, both the reference specimen 4 (if such is employed) and the test specimen 2 are sealed into one end of replaceable test probe insert 6. As shown in FIGURE 1, this sealing may comprise the use of a non-conducting and corrosion-resistant end sealing plug 10 which is placed in the end of tubular replaceable insert tube 6 and sealed in place. End sealing plug 10 may be made of a ceramic material such as lava or porcelain or may be one of the thermosetting organic resins, such as Bakelite (phenol-formaldehyde), depending upon the particular temperature. Alternatively, end sealing plug 10 may itself be made of a deformable organic resin which is clamped in place to tightly seal the protruding portions of specimens 2 and 4 by crimping the ends of the thin protective tube 8. Suitable deformable organic resins include polytetrafluoroethylene "Teflon," polytetrafluoroethylene mixed with a refractory fiber such as asbestos, polyethylene, etc. Suitable electrical leads or connections extend from reference specimen 4 and test specimen 2 through the replaceable probe insert 6; they are partially omitted from FIGURE 1 for reasons of clarity.

Replaceable probe insert 6 contains ceramic insulators 40 which have spaced apertures 42 passing therethrough for the purpose of positioning the respective electrical leads 100 away from each other and thereby eliminating the need for insulating individual wires. These insulators 40 also assure freedom from short circuits. For improved rigidity and mechanical protection of replaceable probe insert 6, leads 100 and insulators 40 may be potted with a suitable sealant such as an epoxy resin or a "Sauereiesen" sodium silicate cement such as #31 or #32.

The portion of replaceable probe insert 6 which is outside of vessel 18 and opposite from the end carrying corrosion specimen 2 has an enlarged annular portion or surface 52 and an enlarged portion having an increased diameter 56 which extends beyond surface 52. Surface 52 conforms to a similar shoulder 50 in the bore 54 of body member 12, and is spaced therefrom by means of an annular deformable gasket 46, which may be made of a corrosion-resistant material such as polytetrafluoroethylene for the purpose of securing a first pressure-tight seal.

Gasket compression cylinder 60, which is made at least in part of an electrically-nonconducting incompressible material such as a ceramic or Bakelite material, is placed within the enlarged or expanded portion 56 of protective tube 8 and is so arranged that pressure applied to the top surface thereof is transmitted to surface 52 and annular gasket 46 so as to secure a tight pressure seal between surface 52 and shoulder 50. Gasket compression cylinder 60 is provided with wire-receiving apertures 62 which are arranged similar to the corresponding wire-receiving apertures 42 in ceramic insulators 40.

On top of gasket compression cylinder 60 is a deformable plug of polytetrafluoroethylene or similar corrosion-resistant deformable material which will deform under pressure. Deformable plug 64 has a forward portion 68 which is forwardly tapered, so that the application of pressure on the back or top surface of deformable plug 64 results in the securing of a tight seal of the plug material with the conduits or leads in aperture 66, as well as a tight seal with body portion 12 at a similar tapered transition surface 58 and with the sides of bore 96. Materials other than polytetrafluoroethylene may be employed for deformable plug 64, and these include organic resins such as polyethylene, natural or synthetic rubber, and inorganic substances such as compressed talc or lava.

To apply sealing pressure to deformable plug 64, a follower 70 is employed. This may be made of a non-deformable material such as steel, and is so constructed as to be received easily in bore 96. Ceramic insulator 72 is retained within an annular bore 84 in follower 70 by means of shoulder 82. If desired, a keyway 78 is milled in one side of follower 70 and a similar keyway 76 is milled in one side of bore 96; key 80 placed in keyways 76 and 78 prevents relative rotary motion between follower 70 and body portion 12. The elimination of relative motion is extremely desirable in the instant probe assembly inasmuch as it prevents rotation between follower 70 and plug 64 which would otherwise tend to shear leads 100 at the junctions of wire-receiving apertures 74 and 66.

As further shown in FIGURE 1, probe body member 12 comprises an elongated corrosion-resistant and pressure-resistant tube 12 having coaxial bores 48, 54 and 96 passing therethrough. The transistion surface between bore 48 and the first enlarged portion of this bore, bore 54, is preferably a flat surface or shoulder 50 upon which is placed annular gasket 46. Also, the transition surface between bore 54 and bore 96 is tapered, preferably conically, so as to provide an inward-compressing force component on deformable plug 64 when the latter is compressed against tapered transition surface 58 by follower 70.

The upper portion of body member 12 is externally threaded with screw threads 86 which engage a corresponding set of internal threads on annular follower nut 88. Follower nut 88 is equipped with shoulder 102 to engage follower 70 and thereby force follower 70 downward against deformable plug 64 when packing nut 88 is rotated. For convenience, packing nut 88 may have polygonal, preferably hexagonal, exterior surfaces to receive a wrench for tightening the nut. Nipple 90 extends from packing nut 88 and is provided with threads 92 for receiving a cap or similar terminal junction box for the purpose of providing weather protection for the terminals of the several lead wires 100. Suitable lead wires connect reference specimen 4 and test specimen 2 into a suitable electrical measuring circuit, such as the circuit shown in FIGURE 4.

Turning now to FIGURE 2, an alternative embodiment of the instant invention is shown. Instead of a monolithic gasket compression cylinder 60, the cylinder is made of two parts, gasket compression ring 44 and apertured insulator 60a. In this embodiment, pressure is transmitted to surface 52 by means of the gasket compression ring 44 which may be made of a relatively incompressible metal such as steel, while insulator 60a maintains lead wires 100 in insulated spaced relationship.

The embodiment shown in FIGURE 3 is a further modification of the inventive probe assembly, and permits the complete elimination of gasket compression cylinder 60. In this embodiment, the surface 52 of tubular replaceable probe 6 is flared outward to define a tapered transition surface, which conforms with a similar tapered transition surface 58 of the bore extending through probe body member 12. An annular gasket 46 is inserted between the respective surfaces. Second stage sealing is afforded by deformable plug 64 which rests upon tapered surface 52 of probe insert 6. Thus, pressures applied to the back of deformable plug 64 are transmitted directly to surfaces 52 and 58, as well as to the bore 96. This embodiment is somewhat less effective than embodiments shown in FIGURES 1 and 2 in extremely high pressure service, since deformable plug 64 also bears directly on insulator 40 or cement or potting compound 38. It does possess the outstanding advantage of being more simply and readily fabricated.

The embodiments shown in FIGURES 1, 2 and 3, or equivalent embodiments within the scope of the present invention, may be used in conjunction with vessels operated at very high pressures and temperatures. To accomplish this (per FIGURE 1), body member 12 is provided with a sealing surface 34 such as on probe body gasket ring 30, and is inserted into vessel 18 via nozzle 22 and nozzle flange 26. Surface 32 of the solid gasket rink 30 contacts probe body flange 28. Sealing surface 34 is machined or lapped to connect with a similar sealing surface 34a on flange 26. Both flanges 26 and 28 are maintained in tight relationship by suitable bolts placed through a series of peripheral holes 36 in the respective flanges. Thus, using this type of arrangement, body member 12 may be inserted into, or withdrawn from, vessel 18 merely by removing the bolts which engage flanges 26 and 28. Equivalent sealing surfaces, such as threads, deformable gaskets, and the like may be used in lieu of the integral solid gasket ring 30. As shown in FIGURE 1, body member 12 may extend via nozzle 22 into the vessel 18 so as to provide further mechanical protection for the probe assembly. The inner end of body member 12 may have perforations 14 to permit easy access of the corrodant to corrosion test specimen 2; this end may, if desired, be removable.

Turning now to FIGURE 4, a simplified electrical circuit is schematically indicated which is adapted for measuring the resistance of expendable test element 2. This circuit includes battery 120 to provide a source of E.M.F., variable resistor 118, ammeter 116, voltmeter 114, and switches 110 and 112 to connect with either reference specimen 4 or expendable corrosion test specimen 2 in the circuit. At the beginning of a test, switch 110 is depressed, permitting current to flow through reference specimen 4, and the intensity of this current is adjusted to any suitable value by appropriate regulation of variable resistor 18. From the reading of ammeter 116 and the reading of voltmeter 114, Ohm's law can be used to give the resistance of reference specimen 4. Similarly, with switch 110 released but switch 112 engaged, the resistance of corrosion test specimen 2 is determined. The ratio of these resistances is computed. These determinations may be made at any desired temperature.

After permitting corrosion test specimen 2 to remain in the corrodant for the desired test period, the previous measurements are again made of the two resistances and again the ratio is computed. Although the temperatures may not be the same before and after corrosion, these ratios are independent of temperature if both specimens are of the same material. The change in ratios during the test is directly related to the loss of metal from the test specimen 2.

From the foregoing description, it is evident that the objects of this invention have been accomplished and a corrosion test probe has been provided which features a replaceable probe insert containing the test specimen 2 and the reference specimen 4 and is doubly sealed by means of gasket 46 and end sealing plug 10, together with deformable plug 64.

Although the invention has been described with reference to preferred embodiments thereof, it is to be understood that these are by way of illustration only. Accordingly, it is contemplated that modifications and variations can be made in the apparatus by those skilled in the art in light of the foregoing description without departing from the spirit and broad scope of the invention.

We claim:
1. A corrosion test probe assembly having a replaceable probe insert which comprises a body member adapted for connection to a port of a vessel experiencing corrosion, said body member having a bore therethrough, the bore having a first and a second annular portion of enlarged diameter near the end outside of said vessel, a tapered transition surface between said first and said second annular portions, a replaceable lead wire-carrying tubular probe insert having a shoulder portion received in said bore, said replaceable probe insert carrying an expendable corrosion test specimen and electrical lead wires connecting thereto, annular gasket means between the shoulder portion of said replaceable probe insert and a corresponding shoulder in the bore of the body member, an incompressible cylinder within said replaceable probe insert adapted to transmit compression force to said gasket means upon application of pressure to said incompressible cylinder, a deformable plug in the bore having a portion thereof conforming to the tapered transition surface between said first and said second annular portions of increased diameter of said bore and having individual apertures for each of said lead wires, an annular follower nut threadably connected to a similar threaded portion of said body member and engaging said follower means, said follower nut being adapted to compress said deformable plug into sealing relationship with said tapered transition surface and said lead wires upon tightening said annular follower nut.

2. The corrosion test probe assembly of claim 1 wherein said deformable plug is comprised of polytetrafluoroethylene.

3. A corrosion test probe assembly having a replaceable probe insert, which assembly comprises a body member having a bore therethrough, said bore having a tapered shoulder portion, a tubular replaceable probe insert having a similarly tapered top portion and receivable in said bore, annular gasket means between both of said tapered portions, an expendable test specimen carried by said replaceable probe insert and having terminals thereof sealed into said insert and having lead wires extending therethrough, a deformable plug having individual apertures therethrough for each of said lead wires and having a tapered portion similar to the tapered portion of said replaceable probe insert, follower means adapted to transmit pressure to the back of said deformable plug and thereby deform the same into sealing relationship with said replaceable probe insert, with the bore of said body member, and with the lead wires in said apertures, and follower nut means threadably engaged with said body member and adapted to apply pressure on said follower means.

4. A doubly-sealed conductometric corrosion test probe assembly which comprises an expendable corrosion test element connected via electrical lead wires to an electrical circuit for measuring changes in resistance of said test specimen, an elongated replaceable tubular probe insert member carrying said test specimen, sealing means adapted to seal said test specimen near one end of said replaceable probe insert member, an enlarged portion near the opposite end of said replaceable probe insert member, a body member adapted to receive said replaceable probe insert member, gasket means between the enlarged portion of said replaceable probe member and the corresponding portion of said body member, a deformable electrically-nonconducting plug having a forward tapering surface and inserted in said body member in back of said replaceable probe insert member, the deformable plug having apertures for receiving the test specimen lead wires, and a non-rotatable follower in back of said deformable plug adapted to urge said deformable plug into sealing relationship with said electrical conduits and with said body member to provide a final seal for said replaceable probe insert.

References Cited in the file of this patent

UNITED STATES PATENTS

| | | |
|---|---|---|
| 2,131,066 | Obermaier | Sept. 27, 1938 |
| 2,864,252 | Schaschl | Dec. 16, 1958 |
| 2,928,726 | Oberly | Mar. 15, 1960 |
| 2,982,930 | Wygant | May 2, 1961 |